United States Patent Office 2,915,490
Patented Dec. 1, 1959

2,915,490

EPOXY RESIN ADHESIVE COMPOSITIONS, THEIR PREPARATION, AND TAPE CONTAINING SAME

Francis C. Hopper and Marguerite Naps, Oakland, Calif., assignors to Shell Development Company, New York, N.Y., a corporation of Delaware No Drawing. Application December 10, 1956
Serial No. 627,137

13 Claims. (Cl. 260—37)

This invention relates to new adhesive compositions and a method for their preparation. More particularly, the invention relates to new adhesive compositions containing certain epoxy resins which are particularly useful and valuable for the bonding of metal-to-metal.

Specifically, the invention provides new and particularly useful adhesive compositions, especially adapted for bonding metal-to-metal, comprising a mixture of a polyglycidyl ether of a tetraphenol which has two hydroxyaryl groups linked to each end of an aliphatic hydrocarbon chain, a normally solid hydroxy-containing glycidyl polyether of a dihydric phenol, a reinforcing filler and epoxy curing agent. As a preferred embodiment, the invention provides adhesive compositions containing the above-described components and, in addition, a polyvinyl acetal.

The invention further provides new adhesive tapes comprising textile materials, and especially glass fiber textile material, impregnated with the aforedescribed composition.

There is an increasing demand in industry, and particularly in the high speed aircraft and missile industries, for adhesives for metal-to-metal bonding which maintain their strength at elevated temperatures, e.g. temperatures of 500° F. or more. Parts made to withstand these temperatures are usually constructed of steel so that the adhesive must have good adhesion to stainless steel.

Bonds with steel and other metals, such as titanium, are particularly difficult to maintain over a period of time at the high temperatures as there is an accelerated break down, thought to be due to oxidation, at temperatures above about 400° F.

It is, therefore, an object of the invention to provide a new adhesive composition. It is a further object to provide a new adhesive composition which is particularly adapted for bonding metals such as steel. It is a further object to provide an adhesive composition which gives bonds with steel that have excellent resistance to high temperature, long time exposure.

It is a further object to provide adhesive compositions which give metal-to-metal bonds having excellent peel and creep resistance at high temperatures. Other objects and advantages of the invention will be apparent from the following detailed description thereof.

It has now been discovered that these and other objects may be accomplished by the new compositions of the invention comprising a mixture of a polyglycidyl ether of a tetraphenol which has two hydroxyaryl groups linked to each end of an aliphatic hydrocarbon chain, a normally solid hydroxy-containing glycidyl polyether of a dihydric phenol, a reinforcing filler, epoxy curing agent. It has been found that these compositions form excellent bonds between metals, such as steel. Further, these bonds have unexpected resistance to high temperatures even when exposed thereto for long periods of time. At the high temperatures, the bonds also have excellent long time load strength at the high temperatures, i.e. do not creep or rupture when under load for extended periods of time. There is in fact no presently known composition which gives as good strength retention as the compositions of the invention.

It has also been found that the addition of a polyvinyl acetal in the hereinafter described proportions causes an unexpected improvement in strength and distensibility of the adhesive bond when applied to metals such as steel. Good strength at high temperatures is due chiefly to cross-linking, and as the polyvinyl acetal resins are thermoplastic, it was surprising to find that they might undergo cross-linking and thereby give improved strength at the high temperatures.

One of the components used in preparing the new adhesive compositions comprise the polyglycidyl ethers of tetraphenols which have two hydroxyaryl groups at each end of an aliphatic hydrocarbon chain. The polyglycidyl ethers are obtained by reacting a mixture of the tetraphenol and epichlorohydrin or glycerol dichlorohydrin with an alkali metal hydroxide as described below. A variety of tetraphenols are used in preparing the polyglycidyl ethers although it is preferred to employ an alpha,alpha,omega,omega - tetrakis(hydroxyphenyl)alkane as is the case with such representative compounds as 1,1,2,2 - tetrakis(hydroxyphenyl)ethane; 1,1,3,3, - tetrakis(hydroxyphenyl)propane; 1,1,4,4, - tetrakis(hydroxyphenyl)butane; 1,1,5,5, - tetrakis(hydroxyphenyl) - 3 - methylpentane; 1,1,4,4 - tetrakis(hydroxyphenyl) - 2 - ethylbutane; 1,1,8,8 - tetrakis(hydroxyphenyl)hexane; 1,1,10,10 - tetrakis(hydroxyphenyl)heptane and the like as well as corresponding compounds containing neutral substituent groups in the chain as with 1,1,3,3 - tetrakis(hydroxyphenyl) - 2 - chloropropane; 1,1,3,3 - tetrakis(hydroxyphenyl) - 2 - nitropropane; 1,1,4,4, - tetrakis(hydroxyphenyl) - 2,3 - dibromobutane; 1,1,6,6-tetrakis(hydroxyphenyl)hexanol-2-, etc. Besides including polyglycidyl ethers of the foregoing phenols, the invention also encompasses polyglycidyl ethers of similar tetraphenols having substituted hydroxyphenyl groups therein as well as polynuclear hydroxyaryl groups. Reference is made to polyglycidyl ethers of such typical compounds as 1,1,2,2 - tetrakis(2 - hydroxy - 5 - methylphenyl)ethane; 1,1,3,3, - tetrakis(4 - hydroxy - 2,6 - ditertiarybutylphenyl)propane; 1,1,6,6 - tetrakis(3 - chloro - 4 - hydroxyphenyl)hexane; 1,1,4,4 - tetrakis - (2-hydroxynaphthyl)butane and the like. Particularly preferred are the tetrakis(hydroxyaryl)alkanes wherein the alkane portion of the molecule contains from 2 to 6 carbon atoms.

The tetraphenols used in preparing the polyglycidyl ethers are a known class of compounds readily obtained by condensing the appropriate dialdehyde with the desired phenol. The condensation is effected by mixing the phenol and the dialdehyde together using a substantial excess of the phenol over the stoichiometric proportions of four moles of the phenol per mole of dialdehyde, saturating the mixture with hydrogen chloride, allowing the mixture to react for several days, and removing the unreacted phenol as by distillation. The phenols condense with the dialdehydes so that the terminal carbon atom is linked to a nuclear carbon atom of the phenol, which nuclear atom is normally in a position of 2 and 4 with respect to the phenolic hydroxyl group.

The polyglycidyl ethers of the tetraphenols may be prepared by adding the tetraphenol to epichlorohydrin using the latter in a ratio of about 2 to 10 molecules of epichlorohydrin per phenolic hydroxyl group of the phenol, and then adding an alkali metal hydroxide such as sodium or potassium hydroxide so as to effect the desired etherification reaction. It is convenient to dissolve the tetraphenol in the substantial stoichiometric excess of epichlorohydrin and heat the mixture to about reflux temperature. Aqueous sodium hydroxide, such as about a 15% to 50% solution, is then added gradually with boiling of the reaction mixture. The water added with the caustic and formed in the reaction is removed by distillation azeotropically with epichlorohydrin. Condensed distillate separates into an upper aqueous phase and a lower epichlorohydrin phase, which latter phase is returned as reflux. It is desirable to add the caustic and conduct the distillation at rates so that the reaction mixture contains at least about 0.5% water in order to have the etherification reactions progress at a reasonably rapid rate. The sodium hydroxide is added in amount that is equivalent on stoichiometric basis to the quantity of starting tetraphenol, or a small excess thereof such as 3% to 5%. Upon completion of the caustic addition and the etherification reactions, unreacted epichlorohydrin is separated by distillation. The residue consisting primarily of the polyglycidyl ether and salt is then added to a mixture of equal volume of toluene and butanone. This solvent mixture dissolves the ether, but not the salt which is removed by filtration. The filtrate is then distilled to separate the solvent and leave the desired polyglycidyl ether.

The polyglycidyl ether of the tetraphenol is a solid epoxy resin at 25° C., and has more than one of the hydrogen atoms of the phenolic hydroxyl groups of the tetraphenol replaced by a glycidyl radical in the average molecule. Usually the average molecule contains about 3 to 4 glycidyl radicals. Other groups in the ether besides a possible very small amount of unetherified phenolic hydroxyl groups, are dihydroxy glyceryl radicals and chlorohydroxyl radicals which likewise are substituted in place of hydrogen atoms of phenolic hydroxyl groups of the initial tetraphenol.

Another component used in preparing the new adhesive compositions of the present invention comprises the normally solid hydroxy-containing glycidyl polyethers of dihydric phenols. These ethers preferably have a melting point above 90° C., and more preferably above 120° C. These glycidyl ethers are also obtained by reacting a dihydric phenol with controlled amounts of epichlorohydrin or glycerol dichlorohydrin with an alkali metal hydroxide. These materials are not generally simple compounds but have a rather complex structure. They may generally be represented by the formula

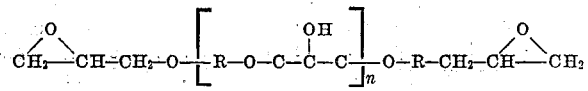

wherein $n$ is 2 or more and R represents the divalent hydrocarbon radical of the dihydric phenol.

Any of the various dihydric phenols may be used in preparing these polyethers including mononuclear phenols such as resorcinol, catechol, hydroquinone, methyl resorcinol, etc.; or polynuclear phenols like 2,2-bis(4-hydroxyphenyl)propane which is termed bis-phenol herein for convenience, 4,4′-dihydroxybenzophenone, bis(hydroxyphenyl)methane, 1,1-bis(4-hydroxyphenyl)ethane, 1,1-bis(4-hydroxyphenyl)propane, 2,2-bis(2-hydroxynaphthyl)pentane, 1,5-dihydroxynaphthalene, etc.

Preferred glycidyl polyethers of the dihydric phenols are the solid glycidyl polyethers of 2,2-bis(4-hydroxyphenyl)alkanes having a molecular weight above 1000 and preferably between 1400 and 4000.

The glycidyl ethers of the dihydric phenols may be better understood from consideration of the following described preparation and properties of one of the products. The parts are by weight.

POLYETHER A 1 mol of 2,2-bis(4-hydroxyphenyl)propane and 1.37 mols of sodium hydroxide as a 10% aqueous solution were combined and heated to about 45° C. whereupon 1.22 mols of epichlorohydrin was added rapidly. The temperature increased and remained at about 95° C. for 80 minutes. The mixture separated into a two-phase system and the aqueous layer was drawn off. The resinous layer that remained is washed, drained and dried. The resulting product had a melting point of 98° C., a molecular weight of 1400 and an epoxide value of 0.103 eq./100 g.

Glycidyl polyethers of still higher molecular weight are more easily prepared by heating together and reacting a lower polyether with additional dihydric phenol. The preparation of glycidyl polyethers by this method is illustrated below.

POLYETHER B 100 parts of polyether A produced above are heated to 150° C. and then 5 parts of bis-phenol added. The heating is continued for about two hours while stirring the reaction mass and gradually increasing the temperature to about 200° C. The resulting product has a melting point of 131° C., a molecular weight of 2900, and an epoxide value of 0.05 eq./100 g.

POLYETHER C

This polyether is prepared as described for polyether B except that the 100 parts of polyether C are mixed, heated and reacted with 7.75 parts of bis-phenol. The resulting product has a softening point of 156° C., a molecular weight of 3750 and an epoxy value of 0.036 eq./100 g.

The glycidyl polyethers of polyhydric phenols are also referred to as "ethoxyline" resins, Chem. Week, 69, 27 (1951).

A further component of the adhesive compositions of the present invention is an inert filler, and preferably one of the group consisting of aluminum powder, asbestos fibers, powdered mica, zinc dust, bentonite, ground glass fibers, Monetta clay and the like. Atomized aluminum powder preferably finer than 100 mesh is particularly preferred.

Another component, particularly if superior strength and distensibility are desired, is a polyvinyl acetal resin. These resins are acetals from reaction of an aldehyde and polyvinyl alcohol, which alcohol is normally derived from polyvinyl acetate. Many polyvinyl acetal resins are commercially available. Thus, a resin sold under the name of Formvar 15/95E (Shawinger Resins Corp.) is a product derived from polyvinyl acetate and is made by replacing 95% of the acetyl groups by formal groups from formaldehyde, the original polyvinyl acetate being a substance which gives a benzene solution of 86 grams per liter having a viscosity of 15 centipoises at 20° C. Similarly a resin known as Alvar 5/80 is a product derived from polyvinyl acetate wherein there is an 80% replacement of acetyl groups by acetal groups and the original polyvinyl acetate had a viscosity of 5 centipoises at 20° C.

Any polyvinyl acetal resin can be used in the composition of the invention although it is preferred that the material be a polyvinyl acetal resin of an alkanal of 1 to 4 carbon atoms. It is also preferred that the resin be derived from polyvinyl acetate with from 50% to 100% of the acetyl groups replaced with alkanal groups (alkylidene groups) of an alkanal of 1 to 4 carbon atoms, which polyvinyl acetal resin has a molecular weight of about 20,000 to 100,000. In all cases, the polyvinyl resins are thermoplastic resins.

Particularly preferred polyvinyl acetal resins are the polyvinyl formal resins having a molecular weight between 20,000 to 80,000.

The above-noted components must be combined in controlled proportions in order to obtain the desired properties. The glycidyl polyether of the tetraphenol should be added in amounts varying from 70 to 90% of the combined weight of glycidyl ethers and preferably in amount of 80% of the combined weight. The glycidyl ether of the dihydric phenol should be added in amounts varying from 10% to 30% of the combined weight of glycidyl ethers and preferably in amount of 20% of the combined weight.

The inert fillers are preferably used in amounts varying from 10 to 200 parts per 100 parts of the glycidyl ethers, and preferably 100 to 200 parts per 100 parts of the glycidyl ethers.

The polyvinyl acetal resin should be added in amounts varying from 7.5 to 30 parts per hundred parts of the combined weight of glycidyl ethers and more preferably from 10 to 25 parts per hundred parts of the combined weight. Smaller amounts than 7.5 parts do not impart the desired improvements.

The hardening of the compositions of the invention to form the insoluble infusible bond is accomplished by adding an epoxy hardening agent and applying heat. The hardening agent may be added during the preparation of the adhesive composition as noted above or may be subsequently added. If the agent is of the latent curing type, i.e. the type that will not react at the lower temperatures, it is generally preferred to add the agent to the composition during its preparation.

Various acidic and basic curing agents may be employed for this purpose. This includes the alkaline materials such as aliphatic and aromatic mono and polyamines, such as ethylene diamine, diethylene triamine, dibutyl amine, piperidine diamine, N,N-diethyl-1,3-propanediamine, meta-phenylene diamine, diaminopyridine, diaminodiphenylsulfone, 1,4-diaminocyclohexane, adducts of polyamines and monoepoxides and acidic materials, such as phosphoric acid, butyldihydrogen phosphate, phthalic anhydride, benzenedisulfonic acid, and the like. The curing agents are preferably used in amounts varying from 1% to 30% based on the weight of the glycidyl polyether. The exact amount of the curing agents containing reactive hydrogen, such as the amines, is preferably determined on an equivalency basis, i.e. sufficient curing agent to furnish one amine hydrogen for every epoxy group on the glycidyl ethers.

Various other materials may be added to the compositions of the invention, such as pigments, plasticizers, and other resins including ureaformaldehyde resins, furfural resins and the like.

As the above-noted glycidyl ethers are generally solid, a solvent should be used in the preparation of the compositions of the invention. Volatile solvents which may escape from the compositions are particularly preferred. Examples of these include, among others, ketones like acetone, methyl ethyl ketone, methyl isobutyl ketone, isophorone, etc.; esters, such as ethyl acetate, butyl acetate, Cellosolve acetate (ethylene glycol monoacetate), methyl Cellosolve acetate; ether alcohols, such as methyl, ethyl or butyl ether or ethylene glycol or diethylene glycol; chlorinated hydrocarbons such as trichloropropane, chloroform, etc., ethers such as tetrahydrofuran. To save expense, these active solvents may be used in admixture with aromatic hydrocarbons, such as benzene, toluene, xylene and the like, and/or alcohols, such as ethyl, isopropyl or butyl alcohol. Other solvents include liquid monoepoxy compounds, including glycidyl allyl ether, glycidyl phenyl ether, styrene oxide, cyano-substituted hydrocarbons, such as acetonitrile, propionitrile, adiponitrile, benzonitrile, and the like.

The compositions of the present invention are preferably prepared by dissolving and mixing the glycidyl ether of the tetraphenol and the glycidyl ether of the dihydric phenol in the desired solvent and then adding the polyvinyl acetal resin, inert filler and curing agent. The order of adding to the solvent however, is not important and may be varied as desired.

The temperature used in the final curing of the composition will vary depending upon the glycidyl polyether selected and the type and amount of curing agent. In general, temperatures of 100° C. to 200° C. are sufficient to effect the cure. Particularly preferred temperatures for use with the preferred compositions range from about 100° to 175° C.

As noted above, the compositions of the invention are particularly suited for use as adhesives. They may be used in the bonding of a great variety of materials, such as metal-to-metal, wood-to-wood, glass-to-glass, glass-to-metal, and the like. They are of particular value, however, in the bonding of metals, such as aluminum-to-aluminum and steel-to-steel. When applied as an adhesive, the compositions may simply be spread on the desired surface to form films of various thicknesses, e.g. 5 mils to 30 mils, and then the other surface superimposed and heat applied.

When the compositions are used as adhesives for metal-to-metal bonding, it has been found advantageous to impregnate cotton, rayon, synthetic fiber or glass cloth textiles with the compositions, and then use the impregnated textiles as a bonding tape for joining the metals. Such tapes provide convenient means for handling and using the compositions in adhesive applications. The tape is inserted between two metals desired to be joined, and the assembly is heated and baked to cure the resin whereby articles are obtained wherein the joined surfaces have not only excellent strength at ordinary temperature, but also retain good strength even though heated at quite elevated temperatures for long periods of time. A preferred tape for such use has a glass fiber textile impregnated with a mixture containing in parts by weight: about 80 parts of a polyglycidyl ether of a tetrakis(hydroxyphenyl)alkane, 20 parts of a solid diglycidyl ether of 2,2-bis(4-hydroxyphenyl)alkane, 20 parts of polyvinyl formal, about 50 to 150 parts of aluminum powder or dust and 20 to 30 parts of 4,4'-diaminodiphenylsulfone.

In addition to their use as adhesives, the new compositions may also be used as protective coatings, and in the fabrication of articles for manufacture.

The invention is illustrated in the following examples, but is not to be construed as limited to details described therein. The parts and percentages are by weight unless otherwise indicated.

*Example I*

80 parts of a polyglycidyl ether of 1,1,2,2-tetrakis(hydroxyphenyl)ethane (M.P. 85° C. and epoxy value of 0.452 eq./100 g.) was dissolved in 55 parts of tetrahydrofuran. 20 parts of polyether C was then added. 20 parts of polyvinyl formal (Formvar 5/95E), 100 parts of aluminum dust and 24.5 parts of diaminodiphenylsulfone were also added to the mixture. The resulting product was a thick syrup.

Glass cloth known as Fiberglas 106-Volan A was passed through the composition of about 60% total solids content and scraped with blades to the desired thickness. The tape was then dried for 15 minutes at 200° F. to remove the solvent. Upon cooling of the adhesive composition, the resulting tape was wound with the use of cellophane barrier film. The adhesive tape was used to bond type 301 steel sheets of 0.05 inch thickness (sulfuric acid etched). The adhesive tape (without barrier film) was placed between two of the steel sheets to form a single one-half inch lap joint. The assembly was then placed in a press at 25 p.s.i. and cured for one-half hour at 240° F. for ½ hour and then at 330° F. for ½ hour. The tensile shear strength in pounds per square inch (p.s.i.) of the bond was determined under various conditions. The results are shown in the table below:

| Test Conditions | Tensile Shear Strength, p.s.i. |
| --- | --- |
| At room temperature, original | 4,215 |
| At room temperature, after 500° F. aging for 200 hours | 1,800 |
| At 500° F., after 8 hours at 500° F. | 1,280 |
| At 500° F., after 200 hours at 500° F. | 1,360 |
| At 500° F., after 400 hours at 500° F. | 1,090 |
| At −70° F., original | 3,680 |
| At −70° F., after 500° F. aging, 8 hours | 1,480 |
| After post cure of 4 hours at 270° F., at room temperature | 4,250 (at 77° F.) |

The above-noted value of 1090 p.s.i. is particularly outstanding as it is the highest value yet obtained on steel under these conditions.

The bend strength of the bond was also determined according to procedure described in specification MIL-8431. The bend strength was 181-198 lbs. and after a post cure of 8 hours at 330° F. was 149 lbs.

The retention of strength at the high temperatures over a period of time is shown by the following results determined by placing load on the bond at the high temperature and noting time for failure.

Results obtained by using adhesives containing only the glycidyl ether of the tetraphenol and adhesives containing only the glycidyl ether of the tetraphenol and the Formvar are also shown.

| Resin, Parts By Weight | Composition of Adhesive, Parts By Weight | Load at 500° F., p.s.i. | Time to Failure, hr. |
|---|---|---|---|
| 100-A | | 240 | 215.4 |
| 100-A | 20-B | 240 | 215.4 |
| 100-A | 20-B  20-C | 400 | 484.2 |

A=polyglycidyl ether of 1,1,2,2-tetrakis(hydroxyphenyl)-ethane.
B=polyvinyl formal (Formvar 5/95E).
C=glycidyl ether of 2,2-bis(hydroxyphenyl)propane.

Example II

Example I was repeated with the exception that the amount of 4,4'-diaminodiphenylsulfone was changed from 24.5 to 29, 30 and 35.5. In each case bonds were obtained having the above-described superior properties. The bond prepared from the composition containing 29 parts of the diaminodiphenylsulfone, for example, had an original tensile shear strength of 4310 (77° F.) and a strength of 1325 at 500° F. after 200 hours at 500° F.

Example III

Example I was repeated with the exception that the amount of aluminum powder filler was changed from 100 to 80, 110 to 120. In each case bonds were obtained having the above-described superior properties. The bond prepared from the composition containing 120 parts of the aluminum filler, for example, had a tensile shear strength of 4050 p.s.i. at room temperature.

Example IV

Example I was repeated with the exception that the glass cloth was replaced with stainless steel woven wire (wire diameter of 0.0065 inch). In this case also bonds were obtained having the above-described superior properties, e.g. a shear strength value of 1296 p.s.i. was obtained at a test temperature of 500° F. after the bond was exposed at 500° F. for 72 hours.

Example V

Example I was repeated with the exception that the adhesive composition was prepared by using the following solvents in place of tetrahydrofuran: acetone, methyl ethyl ketone and mixtures of methylal (boiling point 111° F.), acetone and tetrahydrofuran. In each case, bonds were obtained which had the above-described superior properties. The bond prepared from the composition containing the mixture of methylal, acetone and methyl ethyl ketone, for example, had a shear strength of 4275 p.s.i. at 77° F. and 1140 p.s.i. at 500° F. after 120 hours aging at 500° F.

Example VI

Example I was also repeated with the exception that the adhesive composition was prepared by using melamine and dicyandiamide as the curing agents. In each case, very strong bonds having good heat resistance were obtained.

Example VII 80 parts of a polyglycidyl ether of 1,1,3,3-tetrakis(hydroxyphenyl)propane (solid resin having epoxy value of 0.522 eq./100 g.) was dissolved in 55 parts of tetrahydrofuran. 20 parts of polyether A dissolved in tetrahydrofuran above was then added to the above. 20 parts of Formvar 5/95E dissolved in tetrahydrofuran and 24.5 parts of diaminodiphenylsulfone were added to the stirred mixture. 100 parts of aluminum powder was then added.

The above composition was spread with a 5 mil doctor blade on two clean stainless steel sheets and then dried with mild heating to about 200° F. to remove solvent. The coated sheets were joined and heated for 30 minutes between heat press platens in order to cure the adhesive. The glue line temperature was 330° F. Tests conducted as shown in Example I indicated that the bond was very strong and had good heat resistance.

Glass cloth known as Fiberglas 106-Volan A was impregnated with the composition and scraped with blades to a thickness of about 15 mils. The tape was then dried for 15 minutes at 200° F. to remove the solvent. Upon cooling the resulting tape was wound with the use of cellophane barrier film and then used to bond clean type 301 stainless steel sheets of 0.05 inch thickness. The adhesive tape (without the barrier film) was placed between two sheets to form a single one-half inch overlap. The assembly was clamped lightly together, and cured by heating for one-half hour in an oven set at about 330° F. Shear strength values of the joined sheets prepared using tapes from each of the batches were determined. It was found that the bond had excellent initial shear strength and good shear strength after being heated at 50° F. for 200 hours.

Example VIII 90 parts of a polyglycidyl ether of 1,1,2,2-tetrakis(hydroxyphenyl)ethane as described in Example I was dissolved in 60 parts of acetone. 10 parts of polyether B dissolved in acetone was then added followed by 20 parts of polyvinyl formal (Formvar 5/95E) dissolved in tetrahydrofuran and 24.5 parts of 4,4'-diaminodiphenylsulfone. 100 parts of aluminum powder was then added.

The above composition was spread with a 5 mil doctor blade on two clean aluminum sheets and then dried with mild heating to about 250° F. to remove solvent. The coated sheets were joined and heated for 30 minutes between heat press platens in order to cure the adhesive. The glue line temperature was 330° F. Tests conducted as in Example I showed that the bond was strong and had good heat resistance.

Related results are obtained by replacing the polyglycidyl ether of 1,1,2,2-tetrakis(hydroxyphenyl)ethane in the above process with equivalent amounts of each of the following: polyglycidyl ether of 1,1,5,5-tetrakis(hydroxyphenyl)pentane (epoxy value of 0.514 eq./100 g.), and the polyglycidyl ether of 1,1,6,6-tetrakis(hydroxyphenyl)hexanol-2 (epoxy value 0.442 eq./100 g.).

Example IX 75 parts of a polyglycidyl ether of 1,1,2,2-tetrakis-(hydroxyphenyl)ethane as in Example I was dissolved in 50 parts of acetone. 25 parts of polyether B dissolved in acetone were added followed by 29 parts of diaminodiphenylsulfone and 20 parts of polyvinyl acetal (Alvar 5/80). 30 parts of asbestos was then added.

Glass cloth known as Fiberglas 106-Volan A was passed through the composition and scraped with blades to the desired thickness, e.g. 15 mils. The tape was then dried for 15 minutes at 200° F. to remove the solvent. The resulting tape was wound with the use of polyethylene barrier film. The adhesive tape was stored about 2.5 weeks at about 30° F. and then used to bond clean aluminum sheets. The adhesive tape (without the barrier film) was placed between two aluminum sheets. The assembly was clamped lightly together, and cured by heating for one-half hour in a hydraulic press at about 330° F. Shear strength values of the joined sheets prepared using tapes from each of the batches were determined. Tests conducted as shown in Example I showed the bond to be very strong and have good heat resistance.

Related results are obtained by replacing the diamino-diphenyl-sulfone curing agent in the above experiment with equivalent amounts of each of the following: diaminopyridine and 1,4-diaminocyclohexane.

*Example X*

90 parts of a polyglycidyl ether of 1,1,2,2-tetrakis(hydroxyphenyl)ethane as in Example I was dissolved in acetone and 10 parts of polyether B dissolved in acetone was added followed by 9 parts of dicyandiamide. Glass fabric was impregnated with this solution and dried 15 minutes at 200° F. to remove the solvent. Bonds were made with the resultant tape to stainless steel which had been previously degreased and etched. Bonds were cured 30 minutes at 330° F. The bond had a tensile shear strength at room temperature of 2630 p.s.i. and after 200 hours at 500° F. had a strength of 1030 p.s.i.

*Example XI*

This example illustrates the results that are obtained when the solid glycidyl ether of the dihydric phenol is not utilized in the adhesive composition. Adhesive compositions were prepared as in Example I with the components indicated in the table and these were used to bond steel. The bonds were post cured as indicated below. The shear strengths and bend strengths of the bonds are in the table below:

| Composition of the Adhesive In Parts By Weight | | | Postcure, hrs./° F. | Shear Strength at 77° F., p.s.i. | Bend Strength at 77° F., lbs. |
| --- | --- | --- | --- | --- | --- |
| A | B | C | | | |
| 100 | 20 | 0 | 0 | 3,630 | 156 |
| 80 | 20 | 20 | 0 | 3,900 | 186 |
| 100 | 20 | 0 | 8/330 | 3,225 | 138 |
| 80 | 20 | 20 | 8/330 | 3,560 | 149 |
| 100 | 20 | 0 | 4/400 | 2,700 | 114 |
| 80 | 20 | 20 | 4/400 | 3,435 | 133 |
| 100 | 20 | 0 | 8/400 | 2,460 | 102 |
| 80 | 20 | 20 | 8/400 | 3,015 | 115 |
| 100 | 20 | 0 | 16/450 | 1,860 | No data |
| 80 | 20 | 20 | 16/450 | 2,935 | No data |

A=polyglycidyl ether of 1,1,2,2-tetrakis(hydroxyphenyl)ethane.
B=polyvinyl formal (Formvar 5/95E).
C=diglycidyl ether of 2,2-bis(hydroxyphenyl)propane having melting point of 156° C. and molecular weight of 3500.

*Example XII*

Example X was repeated with the exception that the polyglycidyl ether of 1,1,2,2-tetrakis(hydroxyphenyl)ethane and polyether B were combined in a ratio of 80/20. In this case, the tensile shear strength on steel (p.s.i.) at room temperature was 2700 and at 500° F. after 200 hours aging at 500° F. was 880.

*Example XIII*

Example X was repeated with the exception that the polyglycidyl ether and polyether B were combined in a ratio of 70/30 and the dicyandiamide was used in an amount of 6 parts. In this case, the tensile shear strength on steel (p.s.i.) at room temperature was 2455 and at 500° F. after 200 hours aging at 500° F. was 880.

We claim as our invention:

1. An adhesive composition comprising a mixture of 70% to 90% by weight of a polyglycidyl ether of an alpha,alpha,omega,omega - tetrakis(hydroxyaryl)alkane wherein the alkane group contains from 3 to 6 carbon atoms, and 10% to 30% by weight of a solid polyglycidyl ether of a dihydric phenol, a reinforcing filler and an alkaline epoxy curing agent.

2. An adhesive composition comprising a mixture of 70% to 90% by weight of a polyglycidyl ether of an alpha,alpha,omega,omega - tetrakis(hydroxyaryl)alkane wherein the alkane group contains from 3 to 6 carbon atoms, 10% to 30% by weight of a solid polyglycidyl ether of a dihydric phenol, 10% to 30% by weight of the two glycidyl ethers of a polyvinyl acetal, a reinforcing filler and an alkaline epoxy curing agent.

3. A composition as in claim 2 wherein the glycidyl ether of the alpha,alpha,omega,omega-tetrakis(hydroxyaryl)alkane is a polyglycidyl ether of an alpha,alpha,omega,omega-tetrakis(hydroxyphenyl)alkane.

4. A composition as in claim 2 wherein the glycidyl ether of the alpha,alpha,omega,omega-tetrakis(hydroxyaryl)alkane is a polyglycidyl ether of 1,1,2,2-tetrakis(hydroxyaryl)ethane.

5. A composition as in claim 2 wherein the glycidyl ether of the alpha,alpha,omega,omega-tetrakis(hydroxyaryl)alkane is a polyglycidyl ether of 1,1,3,3-tetrakis(hydroxyphenyl)propane.

6. A composition as in claim 2 wherein the glycidyl ether of the alpha,alpha,omega,omega-tetrakis(hydroxyaryl)alkane is a polyglycidyl ether of 1,1,2,2-tetrakis(hydroxyphenyl)ethane.

7. A composition as in claim 2 wherein the diglycidyl ether of the dihydric phenol is a glycidyl ether of 2,2-bis(4-hydroxyphenyl)propane.

8. A composition comprising 90 to 75 parts of a polyglycidyl ether of an alpha,alpha,omega,omega-tetrakis(hydroxyaryl)alkane wherein the alkane group contains from 2 to 6 carbon atoms, 10 to 25 parts of a diglycidyl ether of a dihydric phenol, 10 to 30 parts of a polyvinyl acetal resin, 10 to 200 parts per 100 parts of the glycidyl ethers of a reinforcing filler and 3 parts to 30 parts per 100 parts of the glycidyl ethers of an alkaline curing agent.

9. A composition comprising a mixture of 90 to 75 parts of a glycidyl polyether of an alpha,alpha,omega,omega-tetrakis(hydroxyaryl)alkane wherein the alkane portion of the molecule contains from 2 to 6 carbon atoms, 25 to 10 parts of a solid diglycidyl polyether of 2,2-bis(4-hydroxyphenyl)propane, having a melting point of about 145 to 160° C. and a molecular weight of about 3750, 10 to 200 parts per 100 parts of the glycidyl polyethers of a reinforcing filler comprising aluminum powder, 10 to 40 parts of a polyvinyl formal resin and 1% to 30% by weight of the glycidyl polyethers of an alkaline curing agent.

10. A composition as in claim 9 wherein the curing agent is 4,4'-diaminodiphenylsulfone.

11. A composition as in claim 9 wherein the glycidyl polyether of the tetrakis(hydroxyaryl)alkane is 1,1,2,2-tetrakis(hydroxyphenyl)ethane.

12. As an article of manufacture, a tape comprising a textile impregnated with a mixture comprising 90 to 75 parts of a glycidyl polyether of an alpha,alpha,omega,omega-tetrakis(hydroxyaryl)alkane wherein the alkane group contains from 2 to 6 carbon atoms, 10 to 25 parts of a diglycidyl ether of a dihydric phenol, 10 to 200 parts per 100 parts of the glycidyl ethers of an inert filler, and 1% to 30% by weight of the glycidyl ethers of an alkaline curing agent.

13. As an article of manufacture, a tape comprising a glass fiber textile impregnated with the composition defined in claim 8.

References Cited in the file of this patent

UNITED STATES PATENTS 2,713,567   Scheibli _____ July 19, 1955

FOREIGN PATENTS 523,286   Canada _____ Mar. 27, 1956